Sept. 9, 1941.    C. B. HUSTON    2,255,488
CONTROL SYSTEM
Filed May 25, 1940
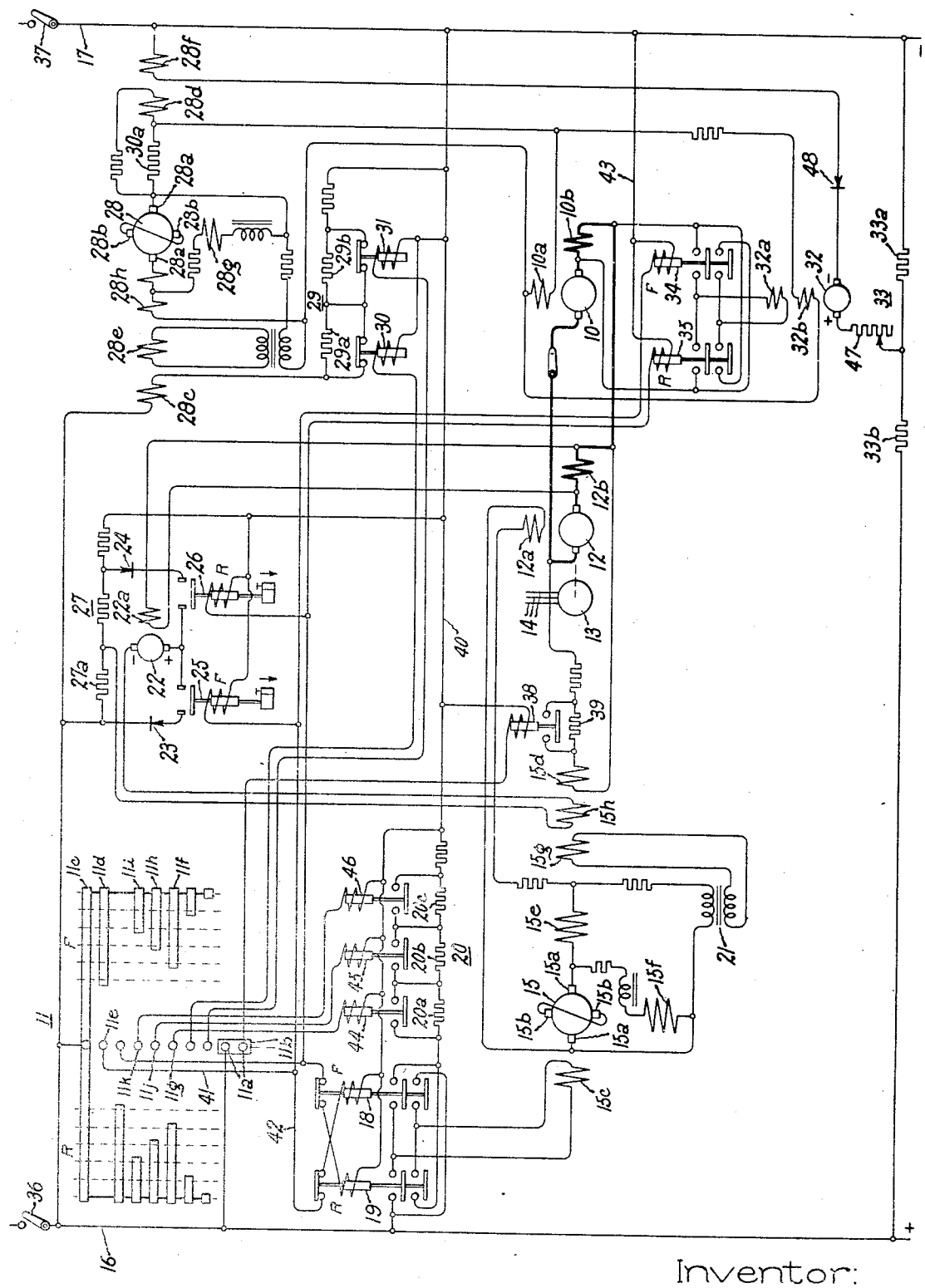
Inventor:
Claude B. Huston,
by Harry E. Dunham
His Attorney.

Patented Sept. 9, 1941

2,255,488

UNITED STATES PATENT OFFICE 2,255,488

CONTROL SYSTEM

Claude B. Huston, Schenectady, N. Y., assignor to General Electric Company, a corporation of New York Application May 25, 1940, Serial No. 337,303

12 Claims. (Cl. 172—239)

This invention relates to control systems, more particularly to systems for controlling the operations of electric motors, and it has for an object the provision of a simple, reliable and improved control system of this character.

The invention is particularly useful for controlling the operations of motors which are utilized to drive blooming mills and other types of reversing mills in the operation of which speed of reversal is an important factor. The motors used in such service are usually supplied from an adjustable voltage generator and a substantial portion of the acceleration of the motor is brought about by varying the voltage of the generator.

In order that the rate of acceleration shall be in keeping with the requirements of the mill, it is an object of this invention to provide means for forcing the voltage of the generator or generators to rise rapidly without the use of resistors in the generator field circuit and the loss of power in such resistors when the motor is not accelerating.

Another object of the invention is the provision of a control system in which simple and improved means are provided for preventing such a rapid decay of generator voltage during deceleration as would lead to excessive and dangerous pump back currents from the motor to the generator.

Another object of the invention is the provision of means for eliminating the residual magnetism of the generator when the master switch is returned from a running position to the off position without interrupting the generator field circuit.

A still further object of the invention is the provision of simple and improved means for strengthening the torque of the motor in accordance with the load on the motor.

Other objects of the invention will become manifest from the following specification.

In carrying the invention into effect in one form thereof, an electric motor is supplied from an adjustable voltage generator provided with a separately excited field winding. An armature reaction excited dynamo-electric machine is provided for controlling the excitation of the generator field. This armature reaction excited machine is provided with a control field winding and with a pair of load brushes which are connected to the generator field winding. A second control field winding is arranged on the armature reaction machine on the same axis with the first control field winding and is excited by the voltage of the generator so as to oppose the magnetism of the first control field winding. In addition, a third control field winding is arranged on the same axis with the first and second control field windings and is excited in accordance with the current exchanged between the generator and motor so as to act cumulatively with the first control field winding.

In illustrating the invention in one form thereof it is shown as embodied in a control system such as would be useful for controlling the operations of a motor which drives a blooming mill.

For a better and more complete understanding of the invention, reference should now be had to the following specification and to the accompanying drawing, the single figure of which is a simple diagrammatical sketch of an embodiment of the invention.

Referring now to the drawing, an electric motor 10 is connected to drive the rolls of a blooming mill and is to be started, accelerated, decelerated, stopped and reversed under the control of a master switch 11 which is illustrated as a multi-position, reversing type master switch.

The armature of motor 10 is connected in a closed loop circuit with the armature of an adjustable voltage generator 12, which is driven at a speed that is preferably substantially constant, by means of an alternating current induction motor 13. This motor is supplied from a suitable source which is represented by the three supply lines 14.

The generator 12 is provided with a main separately excited field winding 12a, the excitation of which is controlled by suitable means illustrated as an armature reaction excited dynamo-electric machine 15. Dynamo-electric machine 15 is driven at a speed which is substantially constant by any suitable driving means such, for example, as a synchronous motor (not shown). The dynamo-electric machine 15 has two sets of brushes. One set of brushes 15a is connected to an external load which in this case is the separately excited field winding 12a of the supply generator. The other set of brushes 15b is short circuited. The axis of the flux which is produced by the current flowing in the short circuited armature conductors is referred to as the short circuit axis and the axis which is displaced 90 electrical degrees from the short circuit axis is referred to as the control axis. If it be assumed that axis of brushes 15b coincides with the short circuit flux axis, then the load brushes 15a are on the control axis. The net flux along the control axis is produced by two opposing control field windings 15c and 15d, and a series compensating field winding 15e and the armature reaction of the load current. It is to be noted that the field winding 15d is connected to be energized by the voltage of the generator 12. The flux along the short circuit axis is produced by the shunt field winding 15f and the armature reaction of the short circuit current. This short circuit axis flux generates the voltage which appears across the load brushes 15a and the control axis flux produces the voltage which appears across the short circuited brushes 15b and causes short circuit current to flow.

The operation of machine 15 will be readily understood by considering the operation without the second control field 15d, the shunt and compensating fields 15f and 15e, and then subsequently considering the effects of these fields on the operation.

Voltage is applied to the control field winding 15c and current begins to build up in it. Immediately there is generated a voltage in the short circuit path which circulates a large current in the short circuit.

Since the resistance of the short circuit is so low as to be almost negligible, the control field winding 15c is only required to produce a very small flux in order to produce a large current in the short circuit and a correspondingly large armature flux. Furthermore, since the flux of the control field winding need only build up to such a low value, and since the resistance and reactance of the short circuited armature are very low, full load current in the short circuit will be obtained in an exceptionally short time. The armature reaction flux produced by the short circuit current generates a voltage across the load brushes 15a and causes load current to flow. This load current will produce an armature flux which would oppose the flux of the control field winding 15c. This would, of course, mean that the flux of control field winding 15c would have to be large enough to overpower this control axis armature flux. However, by using a series field winding 15e through which the load current passes, the armature reaction on the control axis can be completely neutralized. Thus, by the use of this series compensating field, the control field is only required to produce enough field flux and voltage to overcome the resistance drop in the short circuit, and the time constant or rate of response is very fast.

The function of the shunt field winding 15f is to reduce the steady state short circuit current. For any given voltage across the load brushes 15a, there must be a corresponding flux on the short circuit axis. If any part of this flux is produced by a shunt field winding, the amount of flux which will be produced by the short circuit armature current will be correspondingly reduced. For example, if the shunt field is adjusted to give enough excitation to generate nine-tenths of the voltage across the load brushes 15a, the short circuit current for any given load voltage will be only one-tenth as great as it would be if there were no shunt field.

As pointed out in the foregoing, the two control fields 15c and 15d oppose each other. The control field winding 15c is arranged to be connected to the source 16, 17 when either of the forward and reverse directional contactors 18 and 19 is closed and a resistor 20 is included in the circuit. Field winding 15c causes the machine 15 to increase the voltage of generator 12, and field winding 15d which is excited from the voltage of generator 12 causes machine 15 to tend to reduce the voltage of machine 15 and generator 12.

An anti-hunting field 15g is also provided on the control axis of machine 15. It is energized from the secondary of a transformer 21 whose primary winding is connected across the armature of machine 15. In addition, a supplementary field winding 15h is provided on the control axis of machine 15. The excitation of this supplementary field winding is controlled by means of an amplifying generator 22 which interprets armature current of supply generator 12, i. e., its field winding 22a is energized by the voltage drop of the commutating field winding 12b of the generator. The field winding 15h and amplifying generator 22 are provided primarily for the purpose of limiting the pump back current from motor 10 to generator 12 during deceleration. In order that the current limit by control of generator voltage may be confined to pump back current only, reversely connected rectifiers 23 and 24 are provided so that current in one direction only will be detected and contactors 25 and 26 are provided for selectively connecting one or the other of the rectifiers in circuit with amplifying generator 22 depending upon the direction of rotation of motor 10. Further, in order that this pump back current limit feature will come into operation only when the current has exceeded a predetermined value, the circuits are so arranged that an opposing voltage derived from the potentiometer 27 is introduced in the circuit of generator 22. This voltage must be overcome before current can flow in the circuit of field winding 15h.

The mill motor 10 is provided with a field winding 10a the excitation of which is controlled by an armature reaction excited dynamo-electric machine 28 which is identical with machine 15 as described in the foregoing. The load brushes 28a are direct connected to the field winding 10a and the brushes 28b are short circuited.

Four control field windings 28c, 28d, 28e and 28f are provided on the control axes of machine 28. Field winding 28c is separately excited from the control bus 16, 17 with resistor 29 connected in series relationship. Field winding 28d is connected across a resistor 30a in series with the motor field winding 10a and is thus excited in accordance with the motor field current. Field winding 28e is the anti-hunting field winding and field winding 28f is the load control field. Machine 28 is also provided with a shunt field winding 28g and with a series compensating field winding 28h.

Field winding 28c is initially adjusted to establish the field setting of mill motor 10, i. e., to establish the prescribed maximum field strength.

A plurality of contactors 30 and 31 are provided for inserting sections of resistor 29 in the circuit of control field winding 28c, thereby to cause the machine 28 to weaken the field of motor 10. These contactors are controlled by the master switch 11. Although only two contactors are illustrated, a greater number may be provided depending upon the number of steps of field weakening that are desired.

Since the mill motor 10 loses torque rapidly when its field is weakened, an effective load control is necessary whereby the field current can be automatically increased if the load reaches a certain prescribed limit. The load current may become too high for various reasons such as an attempt of the operator to take too heavy a draft for the rolling conditions at the time, or to accelerate to too high a speed. On account of field weakening of the motor, an excessive current is required to produce the necessary torque to carry through the pass under such conditions. When this occurs the load limiting control will automatically strengthen the motor field to increase the torque. This is accomplished by exciting the control field winding 28f on the machine 28 from the amplifying generator 32, the field winding 32a of which receives its excitation from the voltage drop of the line current flowing through the commutating field winding 10b of the motor. Control field winding 28f and the armature of amplifying generator 32 are connected in circuit with potentiometer 33 in such a way that a certain voltage must be produced by the generator before any current will flow in field winding 28f. By this means, the load limiting control has no effect until the load has attained a specified value.

Since the motor has a greater commutating capacity when the field is strong than it has when the field is weak, means are provided for changing the calibration of the load limiting means in accordance with the field strength of the motor. This means is illustrated as comprising a second field winding 32b energized by the voltage applied to the field winding 10a of the motor and connected to act differentially with respect to field winding 32a.

Inasmuch as the excitation of the main mill motor 10 is constant in its direction and the armature or line current is reversing, it becomes necessary to reverse the main current control field of the amplifying generator so that this field will always have the same relationship to the calibrating field. To accomplish this a pair of electromagnetic contactors are provided. The operation of these contactors is controlled by the master switch 11.

With the foregoing understanding of the elements and their organization in the system, the operation of the system itself will readily be understood from the following detailed description.

When the master switch 11 is in the central or off position in which it is shown the voltage of the generator 12 is zero and the motor 10 is at rest. The line switches 36 and 37 are closed and contactor 38 is closed and resistor 39 short circuited. The energizing circuit for contactor 38 is traced from the positive side 16 of the source, through fingers 11a of the master switch bridged by segment 11b, operating coil of contactor 38 and thence by conductor 40 to negative side 17 of the source. The main control field winding 28c of dynamo-electric machine 28 is energized when switches 36 and 37 are closed and this causes machine 28 to supply maximum voltage to the field 10a of mill motor 10 thereby to force the excitation thereof. As the current builds up in field winding 10a, control field winding 28d which is energized in accordance with this current, opposes field winding 28c and causes machine 28 to reduce the voltage applied to field winding 10a. A balanced condition of the fields on the control axis is quickly reached which results in terminating the forcing action when the field strength of motor field 10 reaches normal full strength. Assuming that it is desired to accelerate the mill rolls for a pass in the forward direction, the master switch 11 is moved to the right. The operator usually throws the master switch from its off position to its extreme full speed position in a single rapid movement. The running operations, however, will best be understood by considering the movement of the master switch as occurring in a series of steps.

In the first position of the master switch the contactor 38 is deenergized and opens to insert resistor 39 in the circuit of control field winding 15d. Also, the forward contactors 18, 25 and 34 are energized and closed. The energizing circuit for the coils of these contactors is traced from the power segment 11c of the master switch which is connected to the positive side 16 of the source, to segment 11d and cooperating finger 11e, thence by conductor 41 to conductor 42. At this point the circuit divides, one branch passing through the interlock of reverse contactor 19 and the coil of forward contactor 18 to the conductor 40 which is connected to the negative side 17 of the source, and the other branch passing from conductor 42 through coils of contactors 25 and 34 in parallel and thence by conductors 40 and 43 respectively to the side 17 of the source. Forward contactor 18 in closing connects main control field winding 15c of dynamo-electric machine 15 to the source 16, 17 with resistor 20 in circuit.

In the second position of the master switch an energizing circuit is established for the operating coil of contactor 44. This circuit is traced from power segment 11c to segment 11f and finger 11g thence through the coil of contactor 44 and conductor 40 to negative side 17 of the source. Contactor 44 picks up and short circuits resistor section 20a thereby increasing the energization of control field winding 15c. As a result the voltage of dynamo-electric machine 15 is caused to go to its extreme value. This will be adjusted initially so that double normal voltage or some other suitable value of voltage will be applied to the generator field and thus forcing is obtained to cause the generator field to build up rapidly. As soon as the voltage of the generator builds up to approximately the value which is to be sustained, control field winding 15d becomes sufficiently energized by the generator voltage to oppose field winding 15c and reduce the voltage at the load brushes of machine 15. This results in a balanced condition between the fluxes of control field windings 15c and 15d such that the machine 15 generates the amount of voltage necessary to cause generator 12 to generate the desired amount of voltage for this position of the master switch.

In the third and fourth positions of the master switch, segments 11h and 11i engage fingers 11j and 11k, respectively, and as a result contactors 45 and 46 are closed successively to short circuit resistor sections 20b and 20c thereby to increase the strength of control field 15c. On each of these positions the voltage of the dynamo-electric machine will go to its extreme value before the balanced condition is established. As a result the mill motor 10 is rapidly accelerated to its basic speed. During this field forcing, the operation is stabilized by the anti-hunt field 15g. When the voltage of machine 15 is changing rapidly a voltage is induced in the secondary of anti-hunt transformer 21 which is applied to control field winding 15g in the proper direction to counteract the changing voltage of machine 15.

In the fifth position of the master switch contactor 30 is energized and picked up to open its contacts and insert resistor section 29a in the circuit with main control field winding 28c of dynamo-electric machine 28 thereby to cause machine 28 to decrease the voltage supplied to field winding 10a of the mill motor and to increase the speed of the mill motor.

In the sixth position of the master switch contactor 31 is picked up to open its contacts and insert resistor section 29b in the circuit of control field winding 29c. This causes the machine 28 to decrease still further the voltage supplied to the field winding of the mill motor thereby to increase the speed of the mill motor to a high value.

If the load on the motor becomes excessive for some reason such as the attempt of the operator to accelerate to too high a speed, or an attempt to take too heavy a draft, the amplifying generator 32 whose field winding 32a is energized by the load current of motor 10 will generate a voltage which exceeds the voltage drop across the section 33a of potentiometer 33. As a result current will flow from the left-hand terminal of generator 32 which is positive through resistors 47 and 33a, control field winding 28f, rectifier 48 to the negative terminal of generator 32. Field winding 28f aids control field winding 28c and causes machine 28 to strengthen the field of the mill motor 10. This load limiting control will strengthen the motor field up to maximum if necessary thereby to increase the torque and to limit the load on the motor to a specified safe value. When the load on motor 10 is less than this specified value, the voltage of generator 32 is less than the voltage drop across resistor 33a, and rectifier 48 prevents the flow of current through field winding 28f in the opposite direction. Since the voltage of generator 32 does not overcome the voltage drop across resistor 33a until the load current of the motor attains a specified value, the load limiting control has no effect, and therefore, if the load on the mill motor is light enough, the speed of the motor is free to rise to its maximum value.

When the mill motor 10 is operating at weak field, the differential effect of field winding 32b which is cononected across motor field winding 10a is decreased. This changes the calibration of the load limiting control for different field settings of the mill motor. When the field of the mill motor is strong the differential effect of field winding 32b is large and therefore a high load current will be required to produce sufficient excitation of the main field 32a of the amplifying generator to produce the necessary voltage to counteract the bias voltage of resistor section 33a. Conversely, when the motor field is at a weak setting, then the differential field is likewise weak, and as a result a lesser amount of load current of the mill motor will produce the required amount of voltage of generator 32 to overcome the bias voltage of the resistor 33a.

When the pass is completed, the master switch is returned to the off position to decelerate the mill motor and then moved to the left to reverse the rotation of the mill motor and thereby to effect reverse pass of the billet through the mill rolls. In case the motor field has been weakened as described in the foregoing and the master switch is returned too rapidly to the off position, the voltage of supply generator 12 will decay so rapidly that a severe pump back current from the mill motor will result. As previously explained the field winding 22a of amplifying generator 22 is excited in accordance with the armature current of supply generator 12 and accordingly, the voltage generated by amplifying generator 22 will be proportional to the current of generator 12. If the pump back current to generator 12 exceeds a specified value such that the voltage of generator 22 exceeds the voltage drop across section 27a of potentiometer 17, current will be supplied to the auxiliary control field winding 15h of machine 15. The direction of current flow is from the lower or positive armature terminal of generator 22 through contacts of "forward" contactor 25, rectifier 23, resistor 27a, field winding 15h, to the upper terminal of generator 22. The field winding 15h aids the main control field winding 15c to hold up the voltage of generator 12 and thereby prevent excessive rate of decay of generator voltage and excessive pump back current. The resistor 27a is initially adjusted to have a voltage drop which will not be overcome by amplifying generator 22 until the armature current of generator 12 exceeds a predetermined permissible value. When the generator 12 is supplying current to motor 10, the polarity of the voltage of amplifying generator 22 is reversed and rectifier 23 prevents generator 22 from supplying current to field winding 15h. This rectifier also prevents current from being supplied from the line to field winding 15h when the pump back current is less than the specified value.

It is to be noted that both forward and reverse contactors 25 and 26 are provided with time delay devices so that the contactor which is closed will remain closed for a predetermined time after the master switch is returned to the off position.

When the master switch reaches the off position the main control field winding 15c is disconnected from the source and deenergized and consequently the voltage of the generator 12 decays to the value which results from the residual magnetism of the generator. The auxiliary control field winding 15d which is energized from the generator voltage in such a direction as to oppose main control field winding 15c now has full control to reverse the voltage of machine 15 and thereby reduce the residual magnetism and the voltage of the supply generator 12 to zero. When the residual magnetism of the generator reaches zero, all control force is removed from machine 15 and consequently the voltage of the generator does not pass through zero and build up in the reverse direction but remains at zero. In the off position of the master switch the contactor 38 is picked up and resistor 39 short circuited. This increases the effectiveness of field winding 15d in eliminating the residual magnetism of generator 12. As a result of the elimination of residual magnetism of the main generator, the mill motor will not creep when the master switch is in its off position.

The reverse pass is effected by moving the master switch to the left to effect reverse rotation of the mill motor. The reverse operation is substantially identical with the forward operation except that the reverse contactors 26, 31 and 34 are closed instead of the forward contactors, and the functions performed by rectifier 23 during the forward operation are performed by the rectifier 24 during the reverse operation.

Although in accordance with the provisions of the patent statutes, this invention is described as embodied in concrete form and the principle of the invention has been described together with the best mode in which it is now contemplated applying that principle, it will be understood that the elements and connections shown are merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent in the United States is:

1. A motor control system comprising in combination an adjustable voltage generator provided with a field winding, an electric motor supplied from said generator, means for controlling the excitation of said field winding comprising an armature excited dynamo electric machine having a control field winding and a pair of short circuited armature brushes and a pair of load brushes connected to said generator field winding, and means for limiting pump back current between said motor and generator comprising an auxiliary field winding arranged on the same axis of said dynamo electric machine with said control field winding and means responsive to said pump back current for energizing said auxiliary field winding cumulatively with respect to said control field winding.

2. A motor control system comprising in combination an adjustable voltage generator provided with a field winding, an electric motor supplied from said generator, means for controlling the excitation of said field winding comprising an armature excited dynamo electric machine provided with a control field winding, a pair of short circuited armature brushes and a pair of load brushes connected to said generator field winding, means for exciting said control field winding, means for limiting pump back current from said motor to said generator comprising an auxiliary field winding arranged on the same axis of said dynamo with said control field winding and an auxiliary generator excited by the load current of said adjustable voltage generator for exciting said auxiliary field winding cumulatively with respect to said control field winding, and means for introducing an opposing voltage in the circuit of said auxiliary generator to prevent operation of said pump back current limiting means when said pump back current is less than a predetermined value.

3. A motor control system comprising in combination an adjustable voltage generator provided with a field winding, an electric motor supplied from said generator, means for controlling the excitation of said field winding comprising an armature excited dynamo electric machine provided with a control field winding and having a pair of short circuited armature brushes and a pair of load brushes connected to said generator field winding, means for limiting pump back current from said motor to said generator comprising an auxiliary field winding arranged on the same axis of said armature excited dynamo electric machine with said control field winding, an auxiliary generator excited by the armature current of said adjustable voltage generator for exciting said auxiliary field winding cumulatively with respect to said control field winding and a rectifier in the circuit of said auxiliary field winding to prevent excitation of said winding when said adjustable voltage generator is supplying current to said motor.

4. A motor control system comprising in combination, an adjustable voltage generator provided with a field winding, an electric motor supplied from said generator, means for controlling the excitation of said field winding comprising an armature excited dynamo electric machine provided with a control field winding, a pair of short circuited armature brushes, and a pair of load brushes connected to said generator field winding, means for effecting forward or reverse rotation of said motor comprising a master switch having forward and reverse operating positions and means controlled thereby for connecting said control field winding to a source for excitation in either direction, means for limiting pump back current from said motor to said generator comprising an auxiliary field winding arranged on the same axis of said dynamo electric machine with said control field winding and an auxiliary generator excited from the armature current of said adjustable voltage generator for exciting said auxiliary field winding cumulatively with respect to said control field winding, a pair of reversely connected rectifiers arranged to be connected in the circuit of said auxiliary field winding, and means responsive to operation of said master switch to a forward or reverse position for selectively connecting said rectifiers in the circuit of said auxiliary field winding to prevent energization of said auxiliary field winding when said adjustable voltage generator is supplying current to said motor in either direction.

5. A motor control system comprising in combination, an adjustable voltage generator provided with a field winding, a motor supplied therefrom and provided with a field winding, means for varying the strength of the field of said generator to vary the speed of said motor, and means responsive to the load on said motor for varying the torque of said motor comprising an armature excited dynamo electric machine provided with a control field winding, a pair of short circuited armature brushes, a pair of load brushes connected to said motor field winding and a second control field winding on said dynamo electric machine energized by the armature current of said motor in a direction to cause said dynamo electric machine to strengthen the field of said motor.

6. A motor control system comprising an adjustable voltage generator provided with a field winding, a motor provided with a field winding and supplied from said generator, means for varying the strength of the field of said generator to vary the speed of said motor, means for controlling the excitation of said motor comprising an armature excited dynamo electric machine having a pair of load brushes connected to the field winding of said motor and a control field winding, a second control field winding arranged on the same axis of said machine with said first control field winding, and means comprising an amplifying generator excited by the armature current of said motor for exciting said second control field winding cumulatively with said first control field winding thereby to cause said dynamo electric machine to strengthen the field of said motor.

7. A motor control system comprising an adjustable voltage generator provided with a field winding, a motor provided with a field winding and supplied from said generator, means for varying the strength of the field of said generator to vary the speed of said motor, means for controlling the excitation of said motor comprising an armature excited dynamo electric machine having a pair of load brushes connected to the field winding of said motor and a control field winding, a second control field winding arranged on the same axis of said machine with said first control field winding, means comprising an amplifying generator excited by the armature current of said motor for exciting said second control field winding cumulatively with said first control field winding thereby to cause said dynamo electric machine to strengthen the field of said motor, and means for preventing said amplifying generator from supplying current to said second control field winding when said motor is operating as a generator and is supplying current to said supply generator.

8. A motor control system comprising an adjustable voltage generator provided with a field winding, a motor provided with a field winding and supplied from said generator, means for varying the strength of the field of said generator to vary the speed of said motor, means for controlling the excitation of said motor comprising an armature excited dynamo electric machine having a pair of load brushes connected to the field winding of said motor and a control field winding, a second control field winding arranged on the same axis of said machine with said first control field winding, means comprising an amplifying generator excited by the armature current of said motor for exciting said second control field winding cumulatively with said first control field winding thereby to cause said dynamo electric machine to strengthen the field of said motor, and means for preventing said amplifying generator from supplying current to said second control field winding when said motor is operating as a generator and is supplying current to said supply generator comprising a rectifier included in the circuit of said second control field winding.

9. A control system comprising in combination an adjustable voltage generator, a motor supplied from said generator and provided with a field winding, means for controlling the excitation of said field winding comprising an armature excited dynamo electric machine provided with a control field winding and with a pair of load brushes connected to said motor field winding, a second control field winding arranged on the same axis of said machine with said first control field winding, means for varying the excitation of said control field winding to vary the excitation of said motor, and means responsive to the armature current of said motor for exciting said second control field winding cumulatively with said first control field winding to strengthen the excitation of said motor field winding comprising an amplifying generator having a first field winding excited by the armature current of said motor, means for maintaining said amplifying generator inactive until said motor armature current attains a predetermined value, and calibrating means for varying said predetermined value in accordance with the strength of said motor field.

10. A control system comprising in combination an adjustable voltage generator, a motor supplied from said generator and provided with a field winding, means for controlling the excitation of said field winding comprising an armature excited dynamo electric machine provided with a control field winding and with a pair of load brushes connected to said motor field winding, a second control field winding arranged on the same axis of said machine with said first control field winding, means for varying the excitation of said control field winding to vary the excitation of said motor, and means responsive to the armature current of said motor for exciting said second control field winding cumulatively with said first control field winding to strengthen the excitation of said motor field winding comprising an amplifying generator having a first field winding excited by the armature current of said motor, means for maintaining said amplifying generator inactive until said motor armature current attains a predetermined value, comprising a device for introducing a bucking voltage in circuit with said amplifying generator, and calibrating means for adjusting said predetermined value in accordance with field strength of said motor comprising a second field winding on said amplifying generator connected across said motor field winding so as to be excited differentially with respect to said first field winding of said amplifying generator.

11. A motor control system comprising in combination an adjustable voltage generator provided with a field winding, a motor supplied from said generator, means for controlling the excitation of said field winding comprising an armature excited dynamo electric machine provided with a pair of load brushes connected to said field winding and also provided with a control field winding, a master switch having an off position and a running position, and means responsive to movement of said master switch to said running position for exciting said control field winding thereby to cause said dynamo electric machine to excite said generator field winding, and means for reducing the residual magnetism of said generator to zero when said master switch is moved to said off position comprising a second field winding on said dynamo electric machine arranged on the same axis with said control field winding and connected to be excited by the voltage of said generator differentially with respect to said control field winding.

12. A motor control system comprising in combination an adjustable voltage generator provided with a field winding, a motor supplied from said generator, means for controlling the excitation of said field winding comprising an armature excited dynamo electric machine provided with a pair of load brushes connected to said field winding and also provided with a control field winding, a master switch having an off position and a running position, means responsive to movement of said master switch to said running position for exciting said control field winding thereby to cause said dynamo electric machine to excite said generator field winding, and means for reducing the residual magnetism of said generator to zero when said master switch is moved to said off position comprising a second field winding on said dynamo electric machine arranged on the same axis with said control field winding and connected to be excited by the voltage of said generator differentially with respect to said control field winding, and a current limiting device in circuit with said second field winding and means responsive to movement of said master switch to said off position for rendering said current limiting device ineffective.

CLAUDE B. HUSTON.